United States Patent [19]

Lee

[11] 4,178,803

[45] Dec. 18, 1979

[54] PIPETTING DEVICES

[76] Inventor: Thomas E. Lee, 3938 Canyon Rd., Lafayette, Calif. 94549

[21] Appl. No.: 904,925

[22] Filed: May 11, 1978

Related U.S. Application Data

[63] Continuation of Ser. No. 797,285, May 16, 1977, abandoned, which is a continuation of Ser. No. 662,942, Mar. 1, 1976, abandoned.

[51] Int. Cl.[2] .......................... B01L 3/02; G01F 13/00

[52] U.S. Cl. ................................ 73/425.6; 128/218 C; 141/27; 222/309

[58] Field of Search ......................... 73/425.6, 425.4 P; 128/218 C; 141/1, 2, 18, 21, 25–27, 368, 372; 222/309

[56] References Cited

U.S. PATENT DOCUMENTS

| | | | |
|---|---|---|---|
| 3,613,952 | 10/1971 | Gilmont | 222/309 X |
| 3,770,026 | 11/1973 | Isenberg | 141/2 |
| 3,815,790 | 6/1974 | Allen | 222/309 |

*Primary Examiner*—Frederick R. Schmidt

[57] ABSTRACT

A precision liquid pipetting device having an elongated barrel, a pipette tube mounted to one end of the barrel and a plunger assembly carried in part within the barrel and including a plunger tip reciprocable within the pipette tube to draw liquid into and to dispense liquid from the pipette tube, the improvement comprising a finger button removably secured to the plunger assembly on one end and an adjustable stop mounted on said finger button for limiting movement of said plunger assembly and providing precise control of the amount of fluid dispensed from the pipette tube. In addition, a body extension assembly is provided to adapt the pipetting device for connection to a valve body.

2 Claims, 3 Drawing Figures

PIPETTING DEVICES

This is a continuation of application Ser. No. 797,285, filed May 16, 1977, now abandoned and which is in turn a continuation application of application Ser. No. 662,942, filed Mar. 1, 1976, now abandoned.

This invention relates generally to precision liquid pipetting devices and to improvements therein for adjusting the stroke of a plunger assembly as it is moved to dispense liquid from a pipette tube. In addition, the invention provides a novel extension assembly for increasing the utility of a pipetting device that operates with disposable glass tubes and allows the device to be connected to a standard valve body and liquid reservoir for repetitive dispensing applications.

One object of the present invention is to provide a precision liquid pipetting device with improved means for precisely locating the plunger tip relative to the end of a pipette tube when a plunger assembly is stroked in the direction for dispensing liquid.

Another object of the invention is to provide a precision liquid pipetting device of the kind described including a body extension assembly that adapts the device for connection to a standard valve body and allows the use of disposable glass pipette tubes.

Other objects of this invention will become apparent in view of the accompanying drawings and the following detailed description:

Figure 1:
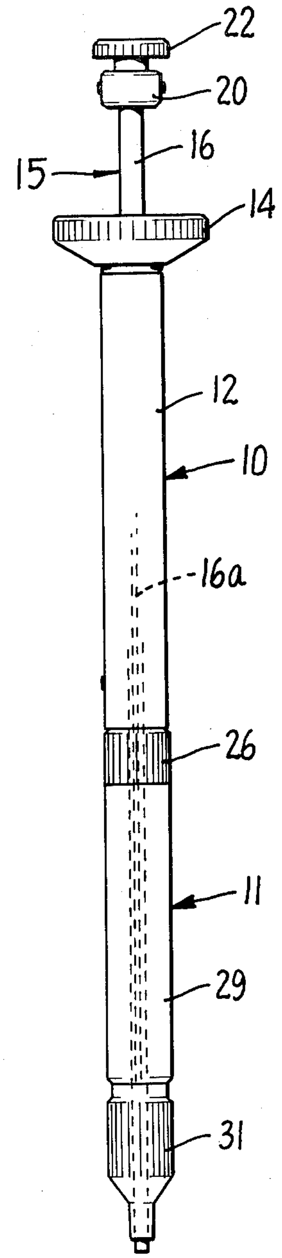
FIG. 1 is a side view of one embodiment of the invention in a precision pipetting device including a body extension assembly.
Figure 2:
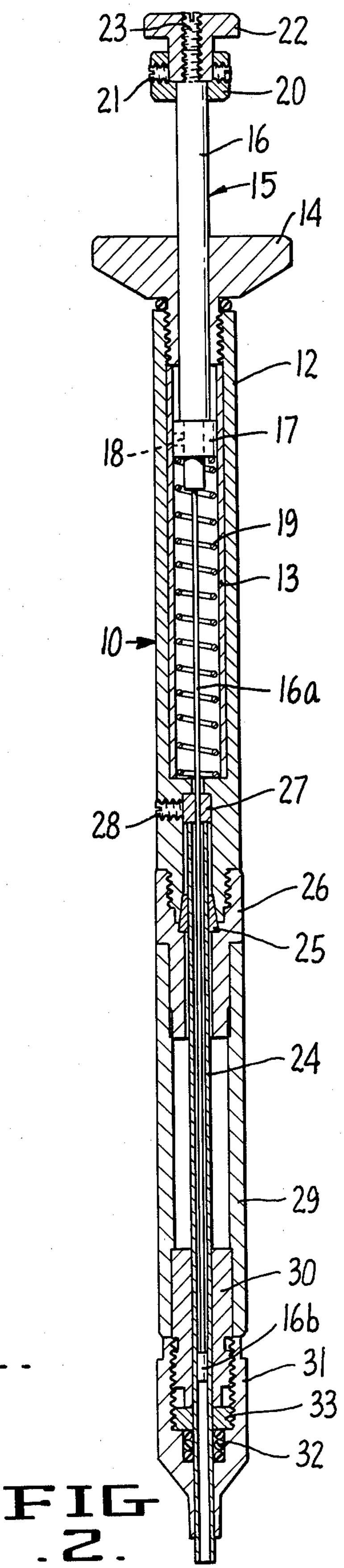
FIG. 2 is a transverse center section taken through the pipetting device and body extension assembly of FIG. 1.

Referring to FIG. 1 in particular, there is illustrated a liquid pipetting device constructed in accordance with this invention and comprising an upper barrel assembly 10 and a lower body extension assembly 11. Assembly 10 essentially comprises a tubular body 12, a liner sleeve 13, a volume cap 14 and a plunger assembly 15, each related to the other as shown in FIG. 2. This general arrangement of parts is essentially the same as that described and illustrated in U.S. Pat. No. 3,815,790.

Plunger assembly 15 more particularly comprises a plunger shaft 16, a plunger wire **16*a* and a spring seat 17, which is carried on the lower end of shaft 16 and secured thereto by a set screw 18. A helical spring 19 is disposed within tubular body 12. The lower end of the spring rests upon the inner bore of the tubular body and the upper end of the spring presses against spring seat 17. As shown in FIG. 2, spring 19 is under slight compression, a full extension of the spring to an unstressed condition being sufficient to carry spring seat 17 into contact with the lower end of volume cap 14**.

It will be apparent that reciprocal movement of plunger shaft 16 is controlled by the axial position and setting of spring seat 17 on the end of shaft 16. This structural arrangement is also essentially the same as that shown in U.S. Pat. No. 3,815,790.

One important and novel structural difference of this invention as compared with prior art pipetting devices involves the use of an adjustable stop 20 that is secured by set screws 21 to a sleeve extension of finger button 22. The finger button itself is mounted to the upper end of plunger shaft 16 by threaded connection and a set screw 23.

This arrangement provides means for limiting movement of the finger button and plunger tip **16*b* when plunger assembly 15 is operated to dispense liquid from a pipette tube 24** (or capillary).

Tube 24 is mounted to the lower end of body 12 in an end bore hole by means of a capillary retainer 25 and a retainer nut 26. The inner end of tube 24 abuts against a calibration stop 27 that is precisely located and held by a set screw 28 within the bore hole of tubular body 12. This structural arrangement and the advantages thereof are fully described in U.S. Pat. No. 3,815,790 and, therefore, forms no part of the present invention. However, in the embodiment shown, retainer nut 26 is provided as part of body extension assembly 11, serving as means for coupling the extension assembly to a barrel assembly 10.

Body extension assembly 11 essentially serves to adapt the pipetting device for connection to a valve body and a fluid reservoir. Although neither the valve body nor a reservoir are shown, these devices are commonly employed in connection with liquid pipetting devices for repetitive dispensing operations.

Body extension assembly 11 comprises the retainer nut 26, an extension sleeve 29 an extender tip 30 and a sealing nut 31. The lower end of sealing nut 31 is formed with a standard configuration for attachment to a valve body of the type described; and body extension sleeve 29 supports the sealing nut in predetermined relationship to the end of pipette tube 24, the end of the tube projecting from the end of sealing nut 31 by approximately 1/16 of an inch.

Both retainer nut 26 and extender tip 30 are cylindrically bored for receiving and supporting pipette tube 24 with a snug fit. It will be further noted that retainer nut 26 includes a tubular portion that extends into extension sleeve 29 and is secured therein with a pressed fit. Retainer nut 26 is also formed with an externally knurled end portion that is internally threaded for engagement with the externally threaded end of tubular body 12. Thus, the body extension assembly may be selectively connected to or disconnected from the barrel assembly 10 as a unit depending on the type of dispensing operation desired.

In a preferred embodiment, sealing nut 31 connects to extender tip 30 by threaded engagement. A set of three O rings 32 are also utilized and held in place within a cylindrical bore of the sealing nut by means of an internal lock ring 33.

Figure 3:
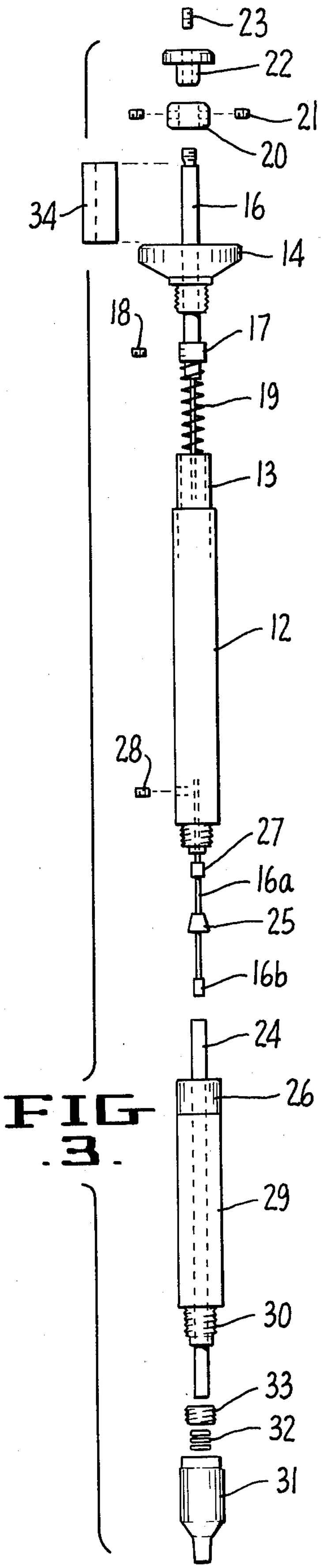
FIG. 3 is an exploded view illustrating various parts of the pipetting devices.

Referring to FIG. 3, a spacer gauge 34 is provided to precisely locate adjustable stop 20 relative to the upper end of volume cap 14. It is further contemplated that pipetting devices constructed in accordance with this invention may be supplied with a plurality of volume caps, each cap of the series having an internal shoulder spaced a different distance from the end of tubular body 12. The selection of a particular volume cap will then determine the extent of plunger travel when plunger assembly 15 is moved to draw liquid into pipette tube 24. If such a series of volume caps are utilized, a series of spacer gauges will also be furnished, one spacer gauge being associated with one of the volume caps for positioning the finger button at precisely the desired distance from the end of tubular body 12. This is necessary since a volume cap that projects into the tubular body 12 to a greater degree than others will shorten the upward movement of plunger shaft 16.

Although a preferred embodiment of the invention has been illustrated and described, various modifications and changes may be resorted to without departing from the spirit of the invention or the scope of the appended claims and each of such modifications and changes is contemplated.

What is claimed is:

1. A precision liquid pipetting device for use with a disposable pipette tube, comprising a tubular body having means adjacent a first end thereof for supporting the disposable pipette tube inserted coaxially therein in a precisely predetermined fixed position longitudinally of said body, a plunger assembly coaxial with said tubular body and mounted therein for reciprocal movement longitudinally thereof, said plunger assembly extending beyond said tubular body and into the disposable pipette tube inserted therein, a cylindrical plunger tip carried on one end of said plunger assembly within said tubular body, said plunger tip having an external diameter substantially equal to the internal diameter of the disposable pipette tube, a finger button removably connected to the other end of said plunger assembly externally of said tubular body and opposite that of said plunger tip, said finger button having a sleeve extending longitudinally of said plunger assembly, a removable end cap mounted on said tubular body at the end thereof opposite said first end and having a passageway therethrough through which said plunger assembly extends in sliding engagement, a first stop slidably mounted on said sleeve of said finger button for abutting said end cap to determine one limit of travel of said plunger tip within the disposable pipette tube, means for fixedly clamping said first stop at selectable positions longitudinally of said sleeve of said finger button, and a second stop fixedly attached to said plunger assembly within said tubular body for abutting said end cap to determine a second limit of travel of said plunger tip; whereby said finger button and first stop, as a unit, may be removed from and resecured to said plunger assembly, allowing said volume end cap to be removed and substituted with another volume end cap, a predetermined gauged distance being maintained between the first stop and a substituted volume end cap while said second stop abuts against said end cap.

2. A precision liquid pipetting device for use with a disposable pipette tube, comprising a tubular body having means adjacent a first end thereof for supporting the disposable pipette tube inserted coaxially therein in a precisely predetermined fixed position longitudinally of said body, a tubular body extension having a first end thereof connected to said first end of said tubular body for mounting said body extension on said body in coaxial relationship therewith, a terminal sealing nut mounted on the end of said tubular body extension opposite said first end thereof, said sealing nut having a tubular valve-body-connecting external diameter and sealingly engaging the external diameter of the disposable pipette tube inserted therethrough and supported thereby near its free end, a plunger assembly coaxial with said tubular body and mounted therein for reciprocal movement longitudinally thereof, said plunger assembly extending beyond said tubular body and into the disposable pipette tube carried within said tubular body extension, a cylindrical plunger tip carried on one end of said plunger assembly within said tubular body extension, said plunger tip having an external diameter substantially equal to the internal diameter of the disposable pipette tube, a finger button removably connected to the other end of said plunger assembly externally of said tubular body and opposite that of said plunger tip, said finger button having a sleeve extending longitudinally of said plunger assembly, a removable end cap mounted on said tubular body at the end thereof opposite said first end and having a passageway therethrough through which said plunger assembly extends in sliding engagement, a first stop slidably mounted on said sleeve of said finger button for abutting said end cap to determine one limit of travel of said plunger tip within the disposable pipette tube, means for fixedly clamping said first stop at selectable positions longitudinally of said sleeve of said finger button, and a second stop fixedly attached to said plunger assembly within said tubular body for abutting said end cap to determine a second limit of travel of said plunger tip; whereby said body extension assembly may be selectively used with the pipetting device for connecting disposable pipette tubes to a valve body, the plunger tip being positioned in precise relationship relative to the terminal sealing nut, said finger button and first stop, as a unit, being removable from and resecured to said plunger assembly to allow said volume end cap to be removed and substituted with another volume end cap while maintaining a predetermined gauged distance between the first stop and a substituted volume end cap.

* * * * *